(12) United States Patent
Al Sayeed

(10) Patent No.: US 11,637,635 B1
(45) Date of Patent: Apr. 25, 2023

(54) CALIBRATING A RAMAN AMPLIFIER BY MAXIMIZING GAIN AND MINIMIZING INTERMODULATION EFFECTS

(71) Applicant: Ciena Corporation, Hanover, MD (US)

(72) Inventor: Choudhury A. Al Sayeed, Stittsville (CA)

(73) Assignee: Ciena Corporation, Hanover, MD (US)

( * ) Notice: Subject to any disclaimer, the term of this patent is extended or adjusted under 35 U.S.C. 154(b) by 0 days.

(21) Appl. No.: 17/544,291

(22) Filed: Dec. 7, 2021

(51) Int. Cl.
*H04B 10/564* (2013.01)
*H04B 10/50* (2013.01)
*H04B 10/079* (2013.01)

(52) U.S. Cl.
CPC ..... *H04B 10/564* (2013.01); *H04B 10/07953* (2013.01); *H04B 10/503* (2013.01)

(58) Field of Classification Search
CPC ............ H04B 10/564; H04B 10/07953; H04B 10/503
USPC .......................................................... 398/25
See application file for complete search history.

(56) References Cited

U.S. PATENT DOCUMENTS

| | | | | |
|---|---|---|---|---|
| 6,731,877 B1 * | 5/2004 | Cao | ................... | H04B 10/2916 398/91 |
| 8,364,036 B2 * | 1/2013 | Boertjes | .............. | H04J 14/0241 398/58 |
| 8,509,621 B2 | 8/2013 | Boertjes et al. | | |
| 9,344,191 B2 * | 5/2016 | Al Sayeed | .......... | H04J 14/0221 |
| 9,419,708 B2 | 8/2016 | Rad et al. | | |
| 9,485,013 B2 | 11/2016 | Al Sayeed et al. | | |
| 9,577,763 B2 | 2/2017 | Al Sayeed et al. | | |
| 9,729,265 B2 | 8/2017 | Hurley et al. | | |
| 9,768,902 B2 | 9/2017 | Al Sayeed et al. | | |
| 9,774,392 B2 | 9/2017 | Doucet et al. | | |
| 9,806,803 B2 | 12/2017 | Bownass et al. | | |
| 9,882,634 B1 | 1/2018 | Al Sayeed et al. | | |
| 9,906,294 B2 | 2/2018 | Al Sayeed et al. | | |
| 9,918,148 B2 | 3/2018 | Swinkels et al. | | |
| 9,973,295 B2 | 5/2018 | Al Sayeed et al. | | |
| 9,985,726 B1 | 5/2018 | Al Sayeed et al. | | |
| 9,986,317 B1 | 5/2018 | Al Sayeed et al. | | |
| 10,063,313 B1 | 8/2018 | Al Sayeed et al. | | |

(Continued)

FOREIGN PATENT DOCUMENTS

| | | | | |
|---|---|---|---|---|
| CA | 2836935 A1 | * | 12/2012 | ........... G02F 1/0123 |
| DE | 602004001078 T2 | * | 1/2007 | ............. G02B 6/264 |

(Continued)

*Primary Examiner* — Abbas H Alagheband
(74) *Attorney, Agent, or Firm* — Baratta Law PLLC; Lawrence A. Baratta, Jr.

(57) ABSTRACT

Systems and methods for calibrating a Raman amplifier in a photonic line system of an optical network are provided. A method, according to one implementation, includes the step of setting the gain of a plurality of pump lasers of a Raman amplifier to a safe level. For example, the pump lasers are configured to operate at different wavelengths. Also, the Raman amplifier is connected to a fiber span having a specific fiber-type. The safe can be defined as a level that keeps adverse intermodulation effects below a predetermined threshold regardless of the specific fiber-type. In addition, the method includes the step of increasing the gain of the pump lasers without prior knowledge of the specific fiber-type of the fiber span while keeping the adverse intermodulation effects below the predetermined threshold.

20 Claims, 11 Drawing Sheets

(56) References Cited

U.S. PATENT DOCUMENTS

| | | | |
|---|---|---|---|
| 10,237,011 B2 | 3/2019 | Al Sayeed et al. | |
| 10,263,386 B1 * | 4/2019 | Sridhar | H01S 3/2391 |
| 10,361,957 B1 | 7/2019 | MacKay et al. | |
| 10,439,709 B1 | 10/2019 | Al Sayeed | |
| 10,536,235 B2 | 1/2020 | Al Sayeed et al. | |
| 10,560,212 B2 | 2/2020 | Al Sayeed et al. | |
| 10,587,339 B1 | 3/2020 | Al Sayeed et al. | |
| 10,680,737 B1 | 6/2020 | Al Sayeed et al. | |
| 10,686,543 B1 | 6/2020 | Al Sayeed et al. | |
| 10,735,837 B1 | 8/2020 | Al Sayeed et al. | |
| 10,826,601 B2 | 11/2020 | Bhatnagar et al. | |
| 10,826,641 B1 * | 11/2020 | Al Sayeed | H04J 14/0261 |
| 10,833,791 B1 * | 11/2020 | Al Sayeed | H04J 14/0224 |
| 2003/0174387 A1 * | 9/2003 | Eggleton | H01S 3/09415 |
| | | | 359/334 |
| 2003/0174938 A1 * | 9/2003 | Headley | H04B 10/2916 |
| | | | 385/27 |
| 2006/0126999 A1 * | 6/2006 | Feldman | G02B 6/02247 |
| | | | 385/24 |
| 2007/0217791 A1 * | 9/2007 | Price | H04B 10/5053 |
| | | | 398/152 |
| 2013/0265634 A1 * | 10/2013 | McClean | H01S 3/094076 |
| | | | 359/334 |
| 2019/0253361 A1 | 8/2019 | MacKay et al. | |
| 2020/0059315 A1 | 2/2020 | Al Sayeed et al. | |
| 2020/0076499 A1 * | 3/2020 | Al Sayeed | H04B 10/03 |

FOREIGN PATENT DOCUMENTS

| | | | | |
|---|---|---|---|---|
| EP | 2 993 807 B1 | | 1/2018 | |
| JP | 2004511007 A | * | 4/2004 | H04B 10/294 |
| JP | 2004287307 A | * | 10/2004 | G02B 6/264 |
| WO | 2020/102011 A1 | | 5/2020 | |

* cited by examiner

| FREQUENCY (in THZ) | ESNR AVERAGE (NODE B TO NODE A) | ESNR AVERAGE (NODE A TO NODE B) | Rx OPTICAL CHANNEL POWER | Rx OPTICAL CHANNEL POWER |
|---|---|---|---|---|
| 191.444 | 12.255 | 11.502 | -7.9 | -7.0 |
| 191.556 | 12.246 | 11.648 | -7.9 | -7.0 |
| 191.669 | 12.659 | 11.453 | -7.0 | -6.0 |
| 191.781 | 12.059 | 9.063 | -7.3 | -6.5 |
| 191.894 | 12.468 | NA at 400-0 | -6.8 | -6.3 |
| 192.006 | 12.238 | 11.690 | -7.2 | -6.4 |
| 192.119 | 12.513 | 11.998 | -6.7 | -5.6 |
| 192.231 | 12.484 | 12.012 | -7.8 | -5.7 |

| FREQUENCY (in THZ) | ESNR AVERAGE (NODE B TO NODE A) | ESNR AVERAGE (NODE A TO NODE B) | Rx OPTICAL CHANNEL POWER | Rx OPTICAL CHANNEL POWER |
|---|---|---|---|---|
| 191.444 | 12.258 | 11.496 | -7.9 | -7.1 |
| 191.556 | 12.305 | 11.627 | -7.8 | -7.1 |
| 191.669 | 12.667 | 11.442 | -7.0 | -6.0 |
| 191.781 | 12.077 | 9.036 | -7.3 | -6.6 |
| 191.894 | 11.494 | 6.724 | -6.6 | -6.3 |
| 192.006 | 12.256 | 11.635 | -7.1 | -6.4 |
| 192.119 | 12.530 | 11.963 | -6.7 | -5.6 |
| 192.231 | 12.493 | 12.000 | -7.8 | -5.7 |

CALIBRATING A RAMAN AMPLIFIER BY MAXIMIZING GAIN AND MINIMIZING INTERMODULATION EFFECTS

TECHNICAL FIELD

The present disclosure generally relates to optical networking systems and methods. More particularly, the present disclosure relates to calibrating a Raman amplifier in order to maximize the gain while minimizing intermodulation effects caused by different operating wavelengths of the multiple pumps of the Raman amplifier.

BACKGROUND

Generally, optical networks are configured to transport optical signals over long distances from one node to the next. Since these optical signals will tend to naturally attenuate over the length of an optical fiber medium, it is important to utilize amplifiers spread out over the photonic line systems for amplifying the signals to sufficient levels for transmission.

One kind of optical amplifier that is often used in optical networks is an Erbium-Doped Fiber Amplifier (EDFA), which is normally arranged for amplification in an egress manner. Another kind of optical amplifier is a Raman amplifier, which is often arranged for amplification in an ingress manner or "counter-propagating" manner, whereby amplification is applied in a direction that is opposite to the direction in which the optical signals are propagating and applied to incoming portions of the optical fiber span that transmit the signals into the Raman amplifier.

With respect to the deployment of Raman amplifiers in an optical network, conventional strategies usually require knowledge of the type of fiber (i.e., "fiber-type") that is used for providing optical signals into Raman amplifiers. The fiber-types usually fall into two different categories, including Non-Dispersion Shifted Fibers (NDSFs) and Non-Zero Dispersion Shifted Fibers (NZDSFs). Along the fiber span, an NDSF has essentially no optical dispersion that would degrade the transmission of optical signals, whereby an NZDSF will be prone to optical dispersion that can degrade the optical transmission.

According to a manual fiber-type provisioning strategy, a Raman amplifier being installed in an optical system will be manually calibrated based on what the installer believes is the fiber-type (e.g., NSDF or NZSDF) corresponding to the Raman amplifier. However, the installer might incorrectly calibrate the Raman amplifier based on a number of different factors. For example, the installer might be given incorrect information about the fiber-type, might misinterpret what different fiber-types have been used, might install the incorrect fiber-type, etc. As a result of incorrect fiber provisioning/installing, it is possible that the Raman amplifier can be set either too high or too low. Also, knowledge of fiber-type may be complicated when different fiber-types are mixed (e.g., sliced) together along the length of a fiber span. If the fiber-type is incorrectly set at a transmit end of a photonic line system, then a calibration process involving Amplified Spontaneous Emission loaded (ASE)—loaded channels might have the wrong launching power, which could be set higher or lower than expected. If the fiber-type is incorrectly set at the receiving end, then the Raman amplifier calibration can be wrong.

In some situations, an automatic fiber characterization process may be run to determine the one or more fiber-types and the actual fiber characteristics. This process is normally run at the "transmitting" end and can be used for automatically correcting for launch profiles. However, existing techniques do not expand to detect fiber types at the "receiving" end where a Raman amplifier may be operating in a counter-propagating direction. Hence, even with currently known techniques, a Raman amplifier at an end of a fiber span has to be manually calibrated based on known fiber-type or the gain of the Raman amplifier has to be reduced to a low level to avoid undesirable effects, such as adverse intermodulation effects (e.g., Four Wave Mixing) caused by different wavelengths or frequencies of the multiple pumps of the Raman amplifier.

With respect to an optical system utilizing only the C-band (i.e., waveband ranging from 1530 nm to 1565 nm), the pumps of a Raman amplifier may have different frequencies that result in the generation of peaks caused by FWM, where the peaks are just out-of-band yet will tend to impact the Optical Signal-to-Noise Ratio (OSNR) of an Optical Supervisory Channel (OSC) at 1511 nm, which may be detected by Course Wavelength Division Multiplexing (CWDM) monitoring devices or the like. To avoid the FWM impact, OSC waves can be moved with respect to the C-band (e.g., using Dense Wavelength Division Multiplexing (DWDM)) to a wavelength of 1516 nm. Additional fixed filters may be used at the end of each span before OSC receiver to take out additional noise impacts.

It may be noted that conventional processes for Raman amplifier setup and gain calibration are highly dependent on the fiber-type of the fiber spans directly before the input ports to the Raman amplifier. For example, if the fiber-type is NDSF (e.g., SMF-28 or other "zero-dispersion" fibers), Raman gain calibration applies specific operating set-points of the pumps to achieve high gain (e.g., pump overlap between two groups of Raman pumps in a C+L-band Raman amplifier). The process allows the Raman gain calibration process to achieve ~3 dB higher gain for a given fiber span and becomes beneficial for longer spans. If the fiber-type is NZDSF (e.g., Large Effective Area Fiber (LEAF), Enhanced LEAF (ELEAF), TrueWave, TrueWave Classic, TrueWave RS, or other "non-zero dispersion" shifted fibers having some degree of dispersion), Raman gain-calibration avoids pump-overlaps and high Raman gain in order to avoid the impact of FWM that affects in-band channels. Based on the fiber-type, Raman gain is dialed down respectively.

For a counter-propagating Raman amplifier, the fiber-type of interest is generally about the last 20 km of fiber span immediately before the Raman. For a given fiber span, if the wrong fiber type is provisioned (e.g., an NDSF fiber where an NZDSF might normally be), Raman gain-calibration might be set to the wrong levels and can generate FWM that can directly affect the OSNR of traffic channels.

Therefore, there is a need in the field of optical networks to provide a photonic line system where a Raman amplifier, particularly one operating in a counter-propagating direction, can be calibrated even without knowledge of the fiber-type of the fiber span leading up to the Raman amplifier. There is also a need to provide systems and methods for calibrating the Raman amplifier while overcoming the above-noted deficiencies. In particular, there is a need to increase the gain of the pump lasers of the Raman amplifier to an optimized level while avoiding the effects of intermodulation problems caused by the pump lasers as a result of the use of fiber-types where optical dispersion might be an issue.

BRIEF SUMMARY

The present disclosure is directed to systems and methods for calibrating a Raman amplifier in a photonic line system of an optical communication network. Calibrating the Raman amplifier may include maximizing the gain of the Raman amplifier during calibration without prior knowledge of the relevant fiber-type. A method, according to one implementation, includes setting the gain of a plurality of pump lasers of a Raman amplifier to a safe level, where the pump lasers operate at different wavelengths. The Raman amplifier is connected to a fiber span having a specific fiber-type. Also, the "safe" level is a level that keeps adverse intermodulation effects below a predetermined threshold regardless of the specific fiber-type. The method further includes the step of increasing the gain of the pump lasers without prior knowledge of the specific fiber-type of the fiber span while keeping the adverse intermodulation effects below the predetermined threshold.

In some embodiments, the adverse intermodulation effects may be caused by the different wavelengths of the pump lasers. The adverse intermodulation effects, for example, may be caused by a Four Wave Mixing (FWM) phenomenon. The severity of the adverse intermodulation effects, for example, may be related to the specific fiber-type of the fiber span.

According to some implementations, the method may include the step of obtaining a first measurement of a noise floor of a spectrum associated with operation of an Optical Multiplex Section (OMS) that includes at least the Raman amplifier and the fiber span when the gain is set to the safe level. Then, a step of setting the first measurement as a baseline noise profile may be performed. Then, the method may include the steps of obtaining a second measurement of the noise floor of the spectrum after the gain is increased and then comparing the second measurement with the baseline noise profile. In response to determining a significant rise in the second measurement with respect to the baseline noise profile, the method may also include the step of reducing the gain back to the safe level. The method may also include a) observing the severity of the adverse intermodulation effects on the spectrum, b) categorizing a plurality of sub-bands in the spectrum based on the severity of adverse intermodulation effects, and c) blocking one or more sub-bands based on the categorizing of the sub-bands before obtaining the second measurement. The method may also include the step of inferring the fiber-type based on the sub-bands that are more severely impacted by the adverse intermodulation effects. Also, the method may include the steps of a) creating two or more sets of interleaved sub-bands in the spectrum, and b) obtaining the second measurement for one set of interleaved sub-bands at a time while blocking the other set or sets of interleaved sub-bands.

In accordance with still additional embodiments, the method may further include the step of maintaining the power of a spectrum within a predetermined variability range, where the spectrum associated with operation of an Optical Multiplex Section (OMS) may include at least the Raman amplifier and the fiber span. The method may also maintain an Optical Signal-to-Noise Ratio (OSNR) of a spectrum above a predetermined threshold. The spectrum, for example, may include C-band wavelengths and L-band wavelengths. The Raman amplifier, for example, may be a counter-propagating amplifier whereby the fiber span of interest includes at least an adjacent portion that provides ingress traffic to the Raman amplifier. The fiber-type, for example, may be a Non-Dispersion Shifted Fiber (NDSF), a Non-Zero Dispersion Shifted Fiber (NZDSF), or other suitable types.

BRIEF DESCRIPTION OF THE DRAWINGS

The present disclosure is illustrated and described herein with reference to the various drawings. Like reference numbers are used to denote like components/steps, as appropriate. Unless otherwise noted, components depicted in the drawings are not necessarily drawn to scale.

FIGS. 12A and 12B are tables showing an example of Effective Signal-to-Noise Ratio (ESNR) and received optical power values obtained at different frequencies with respect to the network of FIG. 4.

DETAILED DESCRIPTION

Figure 1:
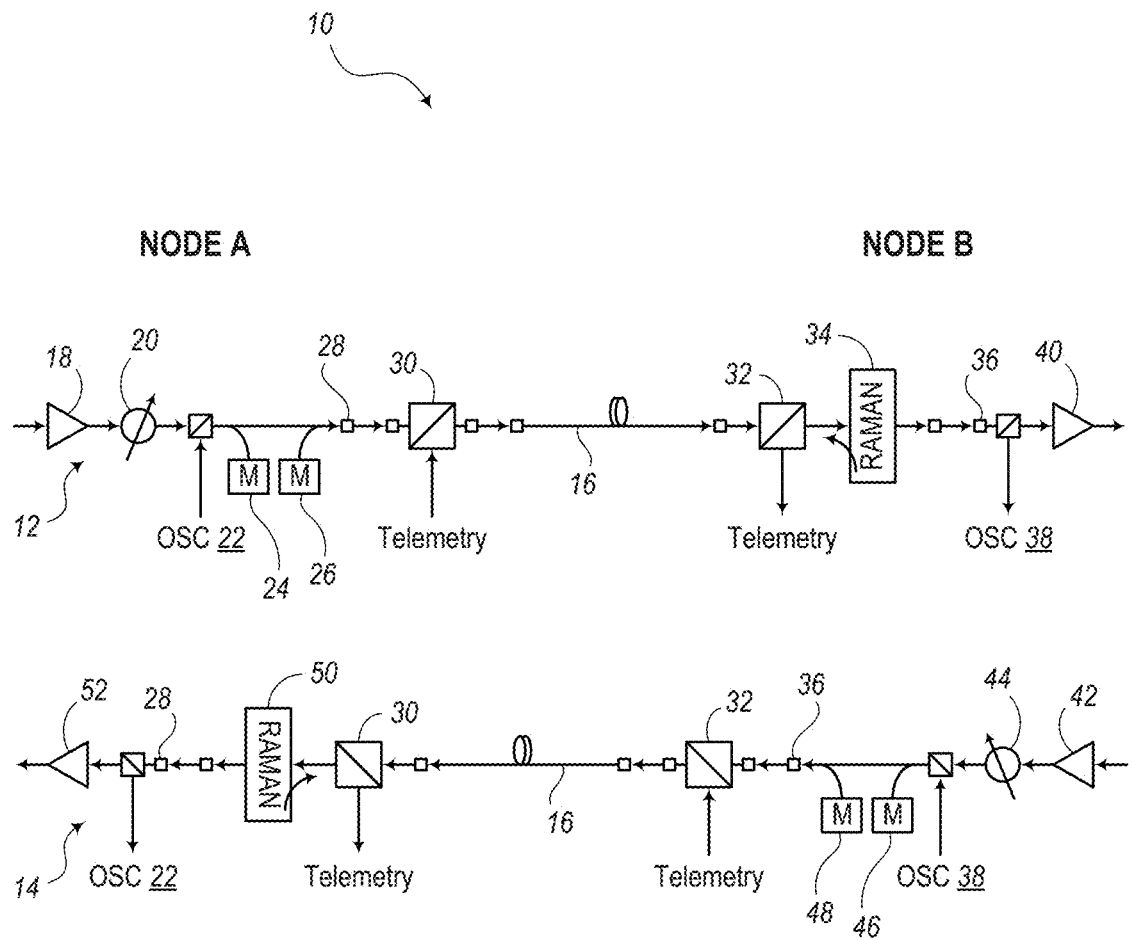
FIG. 1 is a schematic diagram illustrating a portion of an optical network for bi-directional communication between two neighboring nodes, according to various embodiments.

The present disclosure relates to systems and methods for calibrating a Raman amplifier in an optical network or photonic line system, particularly when the Raman amplifier is deployed in a network or system that operates using C-band wavelengths and L-band wavelengths (i.e., "C+L-band" operation). For example, C-band includes wavelength in a range from 1530 nm to 1565 nm and L-band includes wavelengths in a range from 1565 nm to 1625 nm. Therefore, C+L-band includes wavelengths from 1530 nm to 1625 nm.

In the C+L-band, the specific fiber-type of the fiber or fiber span leading up to a Raman amplifier can be a significant consideration in the planning and deployment of the photonic line system. As mentioned above, the fiber-type is usually classified in one of two categories, including zero-dispersion fibers (e.g., Non-Dispersion Shifted Fiber (NDSFs)) having little or no optical dispersion and non-zero dispersion fibers (e.g., Non-Zero Dispersion Shifted Fibers (NZDSFs)) having some optical dispersion. For example, in the C+L-band, the optical system may experience certain adverse intermodulation effects caused by the pump lasers (i.e., pumps) of the Raman amplifier. These adverse intermodulation effects are the result of the operation of the different pumps at different operating frequencies or wavelengths. One specific type of intermodulation problem in the C+L-band is Four Wave Mixing (FWM).

Conventional technologies may typically attempt to adjust the gain of the pumps in order to overcome FWM, such as by using certain modulation techniques and keeping the gain of the Raman amplifier at a low level to minimize of the impact of FWM. However, when designing a network with a NDSF (i.e., having essentially no dispersion issues), the conventional techniques normally do not take advantage of the capabilities of these fibers and increase the gain to a higher level. However, as mentioned above, since the fiber-type might not be known at the Raman amplifier itself, calibrating the Raman amplifier would normally be done manually and may be error prone if the assessment of the fiber-type is incorrect.

The overlap of the operation of pumps with different frequencies can cause FWM, particularly in NZDSFs. In this case, the noise floor may be increased significantly at certain "sub-bands" of the entire spectrum of operation. However, this noise floor "hump" may not be easily detected in conventional practice. Therefore, the systems and methods of the present disclosure are configured to measure the noise floor at different sub-bands, particularly those that may tend to be impacted by FWM, where the measurements are made at different gain levels of the pumps.

Typically, the fiber-type may be known during a planning stage, but errors may occur during installation, such as the splicing of different fiber-types along a fiber span from one node to the next. One node may start with an NDSF at an output of an Erbium-Doped Fiber Amplifier (EDFA), but, along the path to a downstream node, an NZDSF leading up to a Raman amplifier at the downstream node may be spliced onto the NDSF. Thus, since many different types of errors can occur, the fiber-type might not always be known. Without knowledge of fiber-type, the type of algorithm used for determining optimized levels for the Raman amplifier will normally be unknown. Therefore, the present disclosure is configured to overcome this issue and provide an automated way of calibrating a Raman amplifier to allow the Raman amplifier to operate at an optimized high gain level while minimizing any intermodulation effects (e.g., FWM).

There has thus been outlined, rather broadly, the features of the present disclosure in order that the detailed description may be better understood, and in order that the present contribution to the art may be better appreciated. There are additional features of the various embodiments that will be described herein. It is to be understood that the present disclosure is not limited to the details of construction and to the arrangements of the components set forth in the following description or illustrated in the drawings. Rather, the embodiments of the present disclosure may be capable of other implementations and configurations and may be practiced or carried out in various ways. Also, it is to be understood that the phraseology and terminology employed are for the purpose of description and should not be regarded as limiting.

As such, those skilled in the art will appreciate that the inventive conception, upon which this disclosure is based, may readily be utilized as a basis for the designing of other structures, methods, and systems for carrying out the several purposes described in the present disclosure. Those skilled in the art will understand that the embodiments may include various equivalent constructions insofar as they do not depart from the spirit and scope of the present invention. Additional aspects and advantages of the present disclosure will be apparent from the following detailed description of exemplary embodiments which are illustrated in the accompanying drawings.

FIG. 1 is a schematic diagram illustrating an embodiment of a photonic line system 10 of an optical network. The photonic line system 10 allows for bi-directional communication between two neighboring nodes, which are labeled Node A and Node B in FIG. 1. A first path 12 includes elements for transmitting signals from Node A to Node B and a second path 14 includes elements for transmitting signals from Node B to Node A. The top portion of FIG. 1 shows the first path 12, which include at least some of the effective parts of the photonic line system 10 responsible for transmitting optical signals along a fiber span 16 from Node A to Node B. The bottom portion of FIG. 1 shows the second path 14, which includes at least some of the effective parts of the photonic line system 10 responsible for transmitting optical signals along the fiber span 16 from Node B to Node A. For example, the fiber span 16 may include multiple fibers and channels for bidirectional communication between Nodes A and B.

As shown in this embodiment, Node A includes an amplifier 18 (e.g., EDFA), an attenuator 20 (e.g., Variable Optical Attenuator (VOA)), an Optical Supervisory Channel (OSC) element 22, a forward power monitor 24, a reverse power monitor 26, and a faceplace 28. A telemetry element 30 is arranged between Node A and the fiber span 16. A telemetry element 32 and a Raman amplifier 34 (e.g., counter-propagating) are arranged between the fiber span 16 and Node B. Node B includes a faceplate 36, an OSC element 38, and an amplifier 40 (e.g., EDFA).

In the reverse direction from Node B to Node A, Node B includes an amplifier 42 (e.g., EDFA), an attenuator 44 (e.g., VOA), the OSC element 38, a forward power monitor 46, a reverse power monitor 48, and the faceplate 36. The telemetry element 32 is arranged between Node B and the fiber span 16. Also, the telemetry element 30 and a second Raman amplifier 50 (e.g., counter-propagating) are arranged between the fiber span 16 and Node A. Node A includes the faceplate 28, the OSC element 22, and an amplifier 52 (e.g., EDFA).

The photonic line system 10 is configured to operate according to the calibration and optimization techniques described in the present disclosure. The systems and methods of the present disclosure are configured to maximize the gain during the gain-calibration processes of the Raman amplifiers 34, 50 in the line system of the photonic line system 10. More specifically, the present disclosure focuses on maximizing Raman gain in a C+L line system, while eliminating the existing dependency on user-defined fiber-type provisioning.

In the Raman gain calibration process of the present disclosure, the Raman amplifiers 34, 50 (e.g., counter-propagating) normally require uniform, high-power optical spectrum at the input of the Raman amplifiers 34, 50 (e.g., near the respective telemetry elements 32, 30). Such uniform optical spectrum can be generated by launching Amplified Spontaneous Emission (ASE) from a section-mux in an ASE-loaded system (e.g., before the respective amplifiers 18, 42). Alternatively, uniform optical spectrum can be generated per span by generating high-power ASE from the upstream amplifier 18, 42 or any other ASE source At the calibration process, a controller (not shown) for controlling the Raman gain changes different pump ratios of the pump lasers and keeps the Raman gain flat by monitoring incoming spectrum (e.g., at different spectrum locations or "sub-bands"). This can be done using a coarse Optical Power Monitor (OPM) associated with the respective telemetry element 30, 32. While controlling the Raman gain, the embodiments of the present disclosure are also configured to check the maximum and minimum Raman gain that can be achieved for the fiber span 16 without causing non-linear impacts (e.g., double-Rayleigh scattering). Also, while controlling the Raman gain, the embodiments are configured to allow pump-overlaps caused by the different frequencies of the pump lasers (e.g., by applying Pulse Width Modulation (PWM) techniques, if necessary) to increase Raman gain.

At mentioned above, one problem with conventional techniques is that intermodulation effects (e.g., FWM) can cause a spike in the in-band noise floor at the receiving end (i.e., at Raman amplifiers 34, 50). With uniform high-power spectrum loading (e.g., at the amplifiers 18, 42) coming from the upstream node within the line system, the in-band effect cannot be detected. However, the embodiments of the present disclosure are configured to measure the noise-floor at certain sub-bands of the spectrum to determine if certain channels may suffer from operation of the Raman amplifiers 34, 50 at levels that are too high for the specific fiber-type. Thus, the embodiments herein are configured to set the Raman gains of the pumps regardless of the fiber-type or fiber-types and then adjust the gains from this initial point.

Instead of going straight to a final stage of gain settings based on a presumption of the knowledge of the fiber-type, as is normally done in conventional techniques, the embodiments of the present disclosure are configured to perform a "two-step" approach based on an assumption that the fiber-type is not known. The first step in this implementation, for example, may include set the gains at a safe level, which is known to be safe for any fiber-type (e.g., NDSF, NZDSF). At this safe level, the system may take a snapshot of the noise floor (e.g., at selected locations or sub-bands). Step two may include increasing the gain of the pumps of the Raman amplifier (e.g., Raman amplifier 34 or 50) and observing the effect on the noise floor at those selected locations. If the noise increases significantly (e.g., the Optical Signal-to-Noise Ratio (OSNR) decreases significantly), then the gains can be adjusted (e.g., back to the safe level) so that the noise does not exceed a specific threshold or the OSNR stays above a specific threshold. For example, if the pumps are cranked up for an NDSF fiber-type, then there will be little FWM impact and the noise floor will remain relatively flat. However, if an NZDSF is used, FWM will be evident by observing the bumps (increases) at the specific wavelength locations.

This two-step approach can be performed for one Raman amplifier. When this is done, the process can be repeated for another Raman amplifier, and so on, in order to optimize the Raman amplifiers throughout the network. Even if the exact fiber-type is not known throughout the network, the present disclosure does not rely on this information and can proceed to optimize the Raman amplifiers without knowledge of the fiber-types. As a result, however, the present embodiments may be able to deduce from the gain adjustments what type of fiber is being used immediately before the Raman amplifiers.

Figure 2:
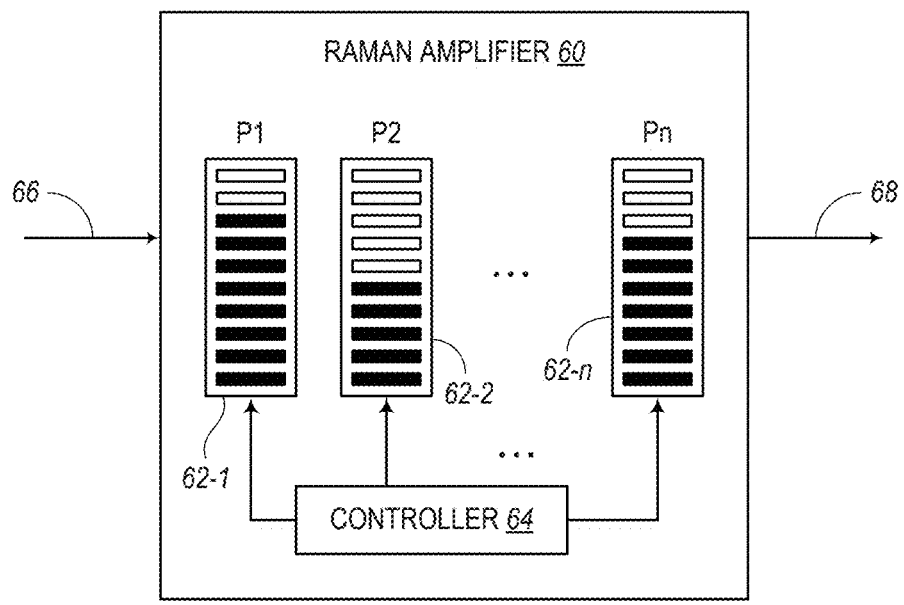
FIG. 2 is a block diagram illustrating a Raman amplifier with adjustable pumps, according to various embodiments.

FIG. 2 is a diagram demonstrating the adjustable gain functionality of a Raman amplifier 60. In this embodiment, the Raman amplifier 60 includes a plurality of adjustable pumps 62-1, 62-2, . . . , 62-n, where n can be any suitable number. A controller 64 is configured to adjust the gain of each pump 62 individually. In some embodiments, the controller 64 may also be configured to adjust the wavelength at which each pump 62 operates.

For example, an EDFA may be configured to pump a spool of Erbium-doped fiber in a module. However, a non-doped Raman amplifier (e.g., Raman amplifier 60), by itself, may be configured to pump a fiber plant. When acting in a counter-propagating direction, the Raman amplifier 60 has a high gain at an input port 66. When acting in a co-propagating direction, the Raman amplifier 60 has a high gain at an output port 68. As the distance from the Raman amplifier 60 increases (in either direction), the gain decreases.

Figure 3:
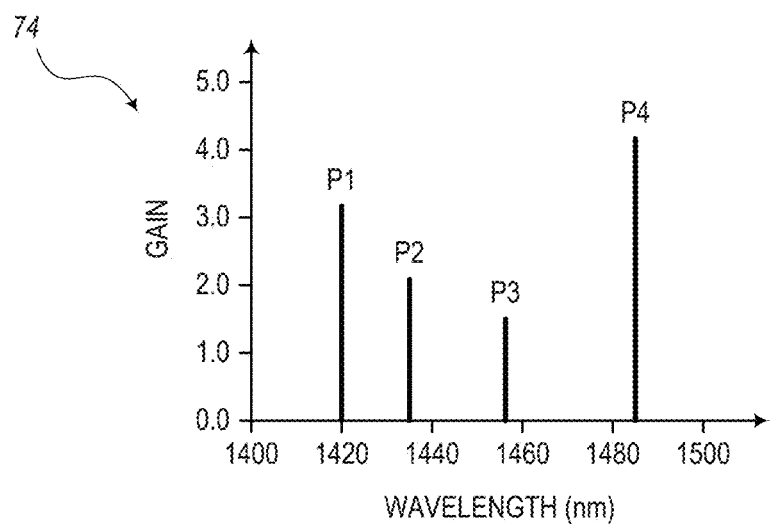
FIG. 3 is a graph illustrating different gain levels of different pump laser of a Raman amplifier, according to various embodiments.

FIG. 3 is a graph 74 illustrating an example of different gain levels of different pump lasers of a Raman amplifier (e.g., Raman amplifier 60). The graph 74 shows the wavelength at which the different pump lasers operate on the x-axis and shows the gain level on the y-axis.

Figure 4:
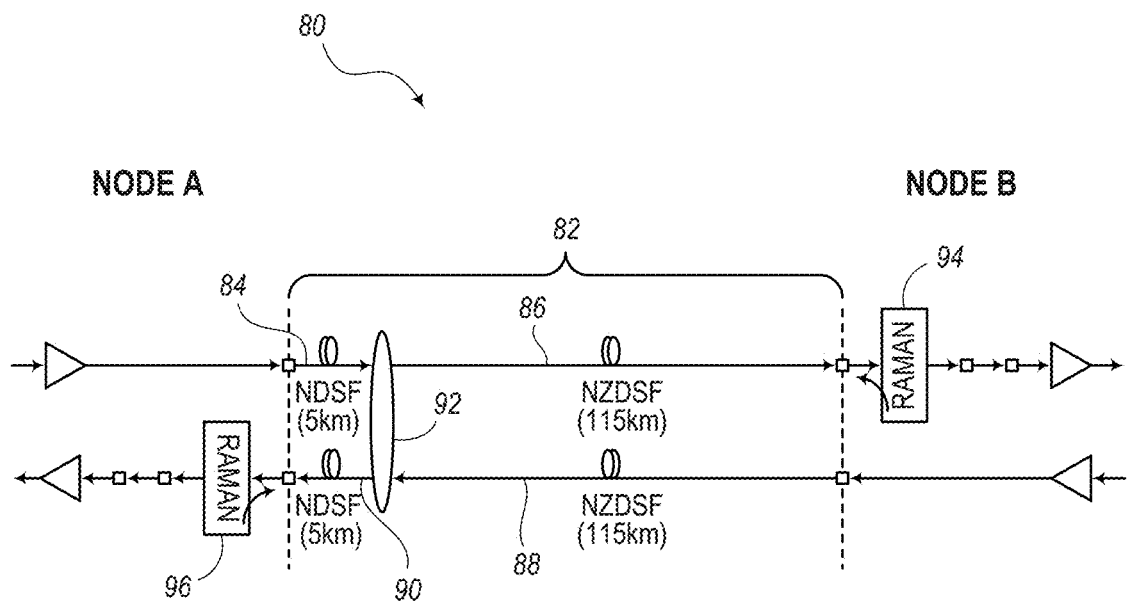
FIG. 4 is a schematic diagram illustrating the portion of the optical network of FIG. 1 in which different types of fiber spans are utilized in a first arrangement, according to various embodiments.

FIG. 4 is a schematic diagram illustrating a photonic line system 80 of an optical network, where the photonic line system 80 may have some similarities to the photonic line system 10 of FIG. 1. In the photonic line system 80, different types of fiber spans are utilized in a first arrangement between Node A and Node B. The specific deployment of the different types of fibers in the photonic line system 80 may be at least partially intentional and/or at least partially accidental or incorrectly deployed. In either case, the different types of fibers can cause issues with the conventional strategies but can be properly handled using the embodiments of the present disclosure.

A fiber span 82 connects Nodes A and B. In a first direction from Node A to Node B, the fiber span 82 includes a first fiber 84 and a second fiber 86. In a second direction from Node B to Node A, the fiber span 82 includes a third fiber 88 and a fourth fiber 90. A glass-through site 92 may be used for splicing the ends of fibers 84 and 86 together and for splicing the ends of fibers 88 and 90 together, which may cause only a small splicing loss.

In this example, the provisioned (intended) fiber-type for effective use with respect to a remote Raman amplifier 94 at the receiving end (i.e., Node B) may be set at Node A as an NDSF. In this case, the first fiber 84 of the fiber span 82 includes an NDSF. However, in the process of installing the fiber span 82, at a certain distance from Node A (e.g., 5 km away), a different type of fiber (i.e., the second fiber 86) is installed (e.g., an NZDSF, such as Enhanced Large Effect Area Fiber (ELEAF), TrueWave Classic, etc.).

As a result, a conventional gain calibration technique for the Raman amplifier 94 will try to maximize the gain on the fiber span 82 with an understanding that the entire fiber span 82 is NDSF. However, since the second fiber 86 of the fiber span 82 (e.g., the last 115 km) leading up to the Raman amplifier 94 is actually an NZDSF. As a result, the intermodulation of the different pump lasers operating together may result in an adverse effect (e.g., FWM) in the NZDSF that will impact the second fiber 86 of the fiber span 82. Similarly, a Raman amplifier 96 at Node A may include the fourth fiber 90 having the correct fiber-type for the first 5 km, but may experience adverse effects because of the NZDSF used beyond the glass-through site 92.

Figure 5:
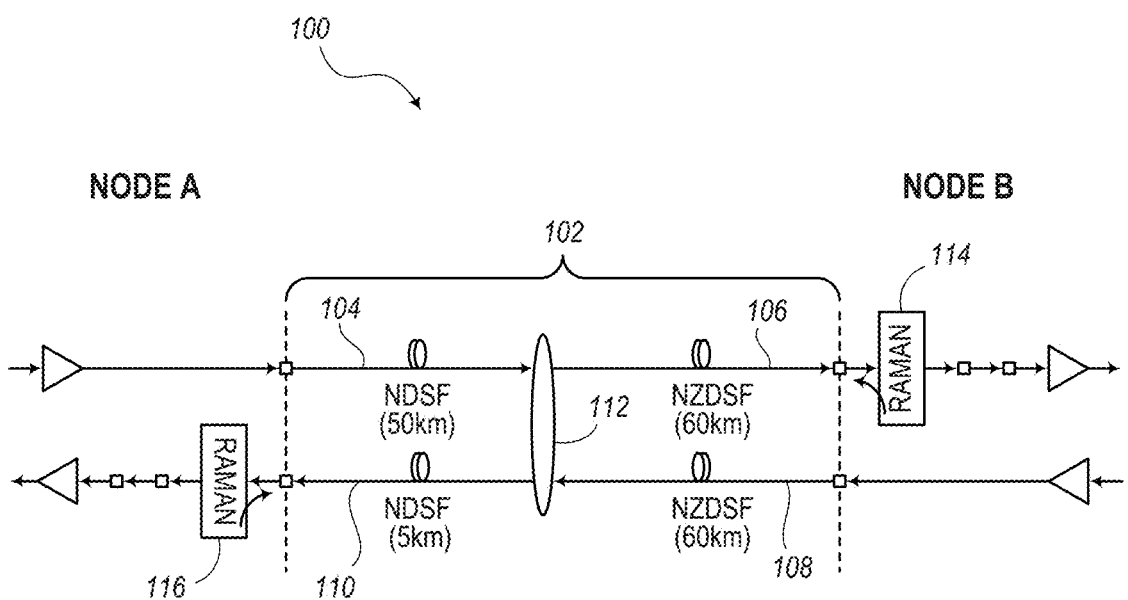
FIG. 5 is a schematic diagram illustrating the portion of the optical network of FIG. 1 in which different types of fiber spans are utilized in a second arrangement, according to various embodiments.

FIG. 5 is a schematic diagram illustrating a photonic line system 100 of an optical network, where the photonic line system 100 may have some similarities to the photonic line systems 10, 80 of FIGS. 1 and 4. In the photonic line system 100, different types of fiber spans are utilized in a second arrangement between Node A and Node B. Again, the specific deployment of the different fiber-types may be partially intentional and/or partially accidental/incorrect, which can cause issues with conventional systems but can be properly handled using the embodiments of the present disclosure.

A fiber span 102 connects Nodes A and B. In a first direction from Node A to Node B, the fiber span 102 includes a first fiber 104 and a second fiber 106. In a second direction from Node B to Node A, the fiber span 102 includes a third fiber 108 and a fourth fiber 110. A glass-through site 112 may be used for splicing the ends of fibers 104 and 106 together and for splicing the ends of fibers 88 and 90 together, which may cause only a small splicing loss.

In this example, the provisioned (intended) fiber-type for effective use with respect to a remote Raman amplifier 114 at the receiving end (i.e., Node B) may be set at Node A as an NDSF. In this case, the first fiber 104 of the fiber span 102 includes an NDSF. However, in the process of installing the fiber span 82, at a certain distance from Node A (e.g., 50 km away), a different type of fiber (i.e., the second fiber 106) is installed (e.g., an NZDSF, such as Enhanced Large Effect Area Fiber (ELEAF), TrueWave Classic, etc.).

As a result, a conventional gain calibration technique for the Raman amplifier 114 will try to maximize the gain on the fiber span 102 with an understanding that the entire fiber span 102 is NDSF. However, since the second fiber 106 of the fiber span 102 (e.g., the last 60 km) leading up to the Raman amplifier 114 is actually an NZDSF. As a result, the intermodulation of the different pump lasers operating together may result in an adverse effect (e.g., FWM) in the NZDSF that will impact the second fiber 106 of the fiber span 102. Similarly, a Raman amplifier 116 at Node A may include the fourth fiber 110 having the correct fiber-type for the first 50 km, but may experience adverse effects because of the NZDSF used beyond the glass-through site 112.

In the examples of FIGS. 4 and 5, if the provisioned fiber-type is set as NDSF (i.e., to match the transmit-end or Node A), then the automatic gain calibration of the remote Raman amplifier 94, 114 will try to maximize the gain on the fiber span resulting a FWM impact at the tail-end (i.e., Node B).

Figure 6:
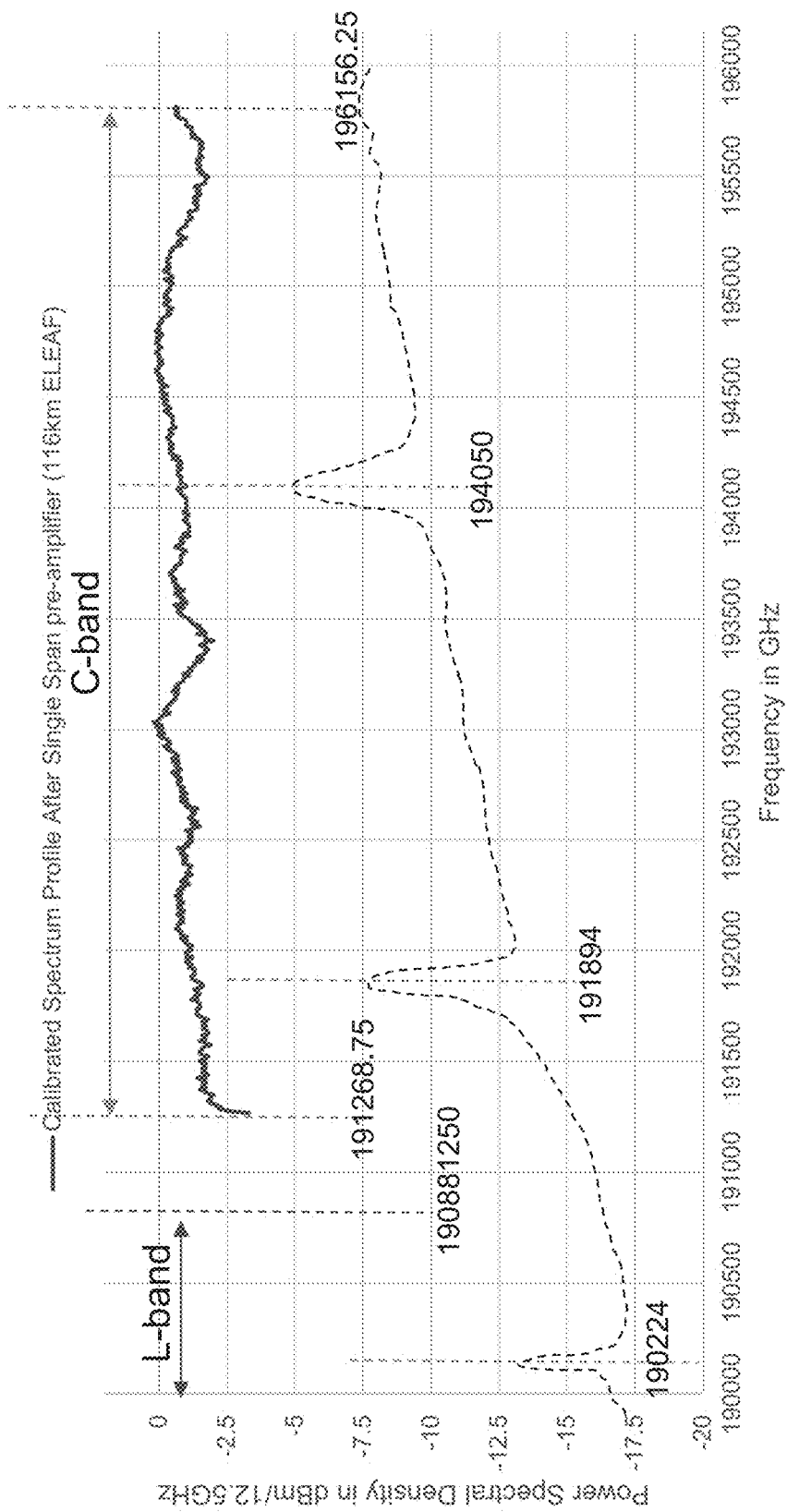
FIG. 6 is a graph showing an example of the effects of a Four Wave Mixing (FWM) phenomenon caused by an improperly calibrated Raman amplifier.

FIG. 6 is a graph 120 showing an example of the effects of a Four Wave Mixing (FWM) phenomenon caused by an improperly calibrated Raman amplifier. The graph 120 shows an example of a receiving spectrum profile after a 116 km NZDSF (i.e., ELEAF) fiber span with underlying in-band FWM peaks when a Raman amplifier is calibrated with an assumption of an NDSF fiber-type. In this case, FWM may impact the underlying in-band noise-peaks. One spike in the L-band, in this example, occurs at a frequency of 190.224 THz. Three spikes in the C-band, in this example, occur at frequencies 191.894 THz and 194.050 THz.

In an Amplified Spontaneous Emission (ASE) - loaded system, the spectrum in this example is loaded at an upstream node (e.g., Node A) with ASE that is used by a downstream Raman amplifier (e.g., at Node B) for its gain calibration. If the Raman amplifier is wrongly calibrated based on the incorrectly-assumed NDSF fiber-type when the actual fiber adjacent to the location of the Raman amplifier is an NZDSF (e.g., ELEAF, TrueWave Classic, etc.), then the pumps of the Raman amplifier will overlap (due to intermodulation effects) at high Raman gain levels. These overlaps generate in-band (e.g., C+L-band) high noise peaks at the certain spectrum locations (e.g., sub-bands at or near the specific frequencies of 190.224 THz, 191.894 THz, and 194.050 THz in this example) due to FWM.

Since FWM creates in-band underlying noise-peaks, they normally do not get any visibility at the receiving spectrum, measured at any spectrum monitors (e.g., OCMs, telemetry elements 30, 32, etc.). However, when traffic channels are being added or restored at certain spectrum locations (e.g., wavelengths, frequencies, sub-bands, etc.), they fail to carry on the desired capacity due to reduced OSNR.

In some cases, L-band Raman pumps can cause FWM in the C-band. For example, FWM may occur at the peaks. Also, the power (gain) of the Raman pumps will normally be lower for NZDSFs and can be higher for NDSFs. Conventional systems normally require manual setup based on the intended fiber-type provisioning. However, as noted herein, this can be an error prone process since there can be situations where there are mixed fiber-types.

For a given Raman pump design in C+L, an example of selective "spectrum locations" where FWM impact is expected can be a) within the frequency range of 190.224 THz +/−50 GHz in the L-band, b) within the frequency range of 191.894 THz +/−50 GHz in the C-band, or c) within the frequency range of 194.050 THz +/−50 GHz in the C-band. There may be multiple spectrum locations where the noise floor can be monitored. These may be location where the impact of FWM is expected or where the impact of FWM is not expected. For example, spectrum locations where FWM is not expected may be selected in the frequency range between about 192.5 THz to about 193.5 THz.

Once the spectrum locations are selected from across the entire spectrum (e.g., C+L-band spectrum), the noise floor profiles can be monitored and compared with baseline levels. Alternatively, spectrum locations that are expected to be affected by FWM may be compared with spectrum locations that are not expected to be affected by FWM. For example, the spectrum locations may be divided in equal bandwidth sections (e.g., bandwidths covering a range of about 100 GHz to about 200 GHz).

In order to add robustness to the implementation, at the beginning of the second step, certain selected spectrum locations can be blocked while the remaining spectrum locations can be monitored. In some embodiments, monitoring may include taking the baseline of a noise floor, which can be integrated over each blocked bandwidth. Later, when the Raman gain is maximized, the respective noise floor can be compared with previously taken baseline measurements. Also, a relative comparison among spectrum locations can be done to further ensure the monitoring of the effect of FWM visibility.

Figure 7:
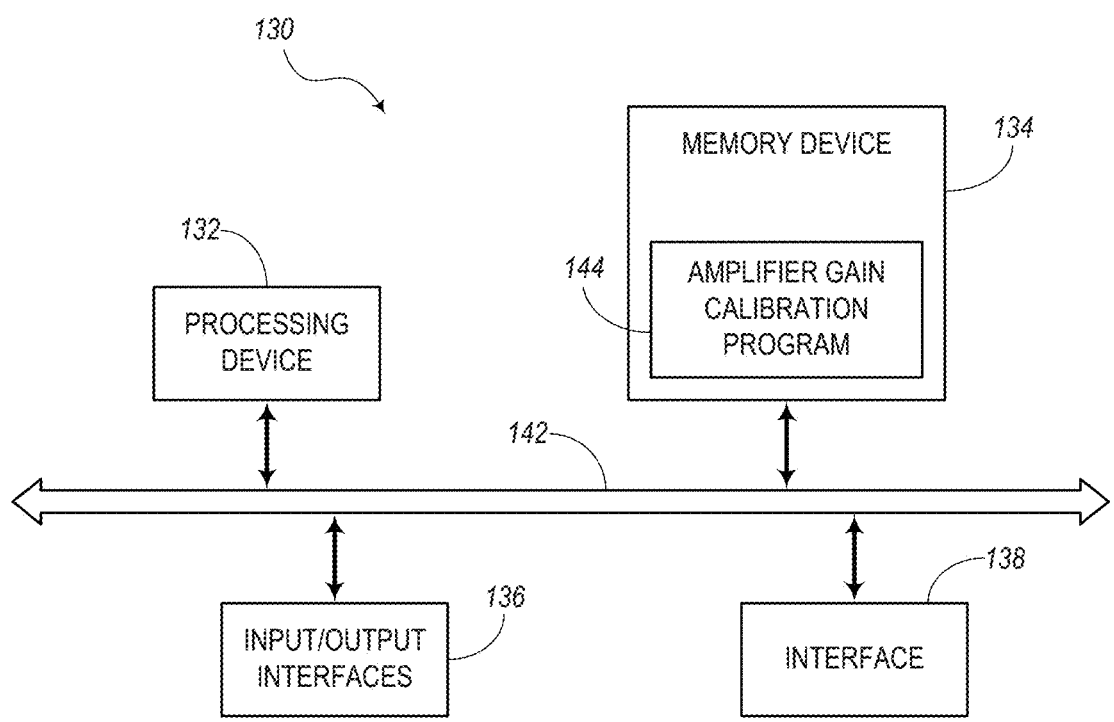
FIG. 7 is a block diagram illustrating a computing device for adjusting the gain of a Raman amplifier, according to various embodiments.

FIG. 7 is a block diagram illustrating a computing device 130 for adjusting the gain of a Raman amplifier. In some embodiments, the computing device 130 may be configured as a controller, such as the controller 64, for controlling the gain of each of a number of pump lasers of a Raman amplifier utilized in an optical network. In the illustrated embodiment, the computing device 130 may be a digital computing device that generally includes a processing device 132, a memory device 134, Input/Output (I/O) interfaces 136, and an interface 138. It should be appreciated that FIG. 7 depicts the computing device 130 in a simplified manner, where some embodiments may include additional components and suitably configured processing logic to support known or conventional operating features. The components (i.e., 132, 134, 136, 138) may be communicatively coupled via a local interface 142. The local interface 142 may include, for example, one or more buses or other wired or wireless connections. The local interface 142 may also include controllers, buffers, caches, drivers, repeaters, receivers, among other elements, to enable communication. Further, the local interface 142 may include address, control, and/or data connections to enable appropriate communications among the components 132, 134, 136, 138.

It should be appreciated that the processing device 132, according to some embodiments, may include or utilize one or more generic or specialized processors (e.g., microprocessors, CPUs, Digital Signal Processors (DSPs), Network Processors (NPs), Network Processing Units (NPUs), Graphics Processing Units (GPUs), Field Programmable Gate Arrays (FPGAs), semiconductor-based devices, chips, and the like). The processing device 132 may also include or utilize stored program instructions (e.g., stored in hardware, software, and/or firmware) for control of the computing device 130 by executing the program instructions to implement some or all of the functions of the systems and methods described herein. Alternatively, some or all functions may be implemented by a state machine that may not necessarily include stored program instructions, may be implemented in one or more Application Specific Integrated Circuits (ASICs), and/or may include functions that can be implemented as custom logic or circuitry. Of course, a combination of the aforementioned approaches may be used. For some of the embodiments described herein, a corresponding device in hardware (and optionally with software, firmware, and combinations thereof) can be referred to as "circuitry" or "logic" that is "configured to" or "adapted to" perform a set of operations, steps, methods, processes, algorithms, functions, techniques, etc., on digital and/or analog signals as described herein with respect to various embodiments.

The memory device 134 may include volatile memory elements (e.g., Random Access Memory (RAM), Dynamic RAM (DRAM), Synchronous DRAM (SDRAM), Static RAM (SRAM), and the like), nonvolatile memory elements (e.g., Read Only Memory (ROM), Programmable ROM (PROM), Erasable PROM (EPROM), Electrically-Erasable PROM (EEPROM), hard drive, tape, Compact Disc ROM (CD-ROM), and the like), or combinations thereof. Moreover, the memory device 134 may incorporate electronic, magnetic, optical, and/or other types of storage media. The memory device 134 may have a distributed architecture, where various components are situated remotely from one another, but can be accessed by the processing device 132.

The memory device 134 may include a data store, database, or the like, for storing data. In one example, the data store may be located internal to the computing device 130 and may include, for example, an internal hard drive connected to the local interface 142 in the computing device 130. Additionally, in another embodiment, the data store may be located external to the computing device 130 and may include, for example, an external hard drive connected to the Input/Output (I/O) interfaces 136 (e.g., SCSI or USB connection). In a further embodiment, the data store may be connected to the computing device 130 through a network and may include, for example, a network attached file server.

Software stored in the memory device 134 may include one or more programs, each of which may include an ordered listing of executable instructions for implementing logical functions. The software in the memory device 134 may also include a suitable Operating System (O/S) and one or more computer programs. The O/S essentially controls the execution of other computer programs, and provides scheduling, input/output control, file and data management, memory management, and communication control and related services. The computer programs may be configured to implement the various processes, algorithms, methods, techniques, etc. described herein.

Moreover, some embodiments may include non-transitory computer-readable media having instructions stored thereon for programming or enabling a computer, server, processor (e.g., processing device 132), circuit, appliance, device, etc. to perform functions as described herein. Examples of such non-transitory computer-readable medium may include a hard disk, an optical storage device, a magnetic storage device, a ROM, a PROM, an EPROM, an EEPROM, Flash memory, and the like. When stored in the non-transitory computer-readable medium, software can include instructions executable (e.g., by the processing device 132 or other suitable circuitry or logic). For example, when executed, the instructions may cause or enable the processing device 132 to perform a set of operations, steps, methods, processes, algorithms, functions, techniques, etc. as described herein according to various embodiments.

The methods, sequences, steps, techniques, and/or algorithms described in connection with the embodiments disclosed herein may be embodied directly in hardware, in software/firmware modules executed by a processor (e.g., processing device 132), or any suitable combination thereof. Software/firmware modules may reside in the memory device 134, memory controllers, Double Data Rate (DDR) memory, RAM, flash memory, ROM, PROM, EPROM, EEPROM, registers, hard disks, removable disks, CD-ROMs, or any other suitable storage medium.

Those skilled in the pertinent art will appreciate that various embodiments may be described in terms of logical blocks, modules, circuits, algorithms, steps, and sequences of actions, which may be performed or otherwise controlled with a general purpose processor, a DSP, an ASIC, an FPGA, programmable logic devices, discrete gates, transistor logic, discrete hardware components, elements associated with a computing device, controller, state machine, or any suitable combination thereof designed to perform or otherwise control the functions described herein.

The I/O interfaces 136 may be used to receive user input from and/or for providing system output to one or more devices or components. For example, user input may be received via one or more of a keyboard, a keypad, a touchpad, a mouse, and/or other input receiving devices. System outputs may be provided via a display device, monitor, User Interface (UI), Graphical User Interface (GUI), a printer, and/or other user output devices. I/O interfaces 136 may include, for example, one or more of a serial port, a parallel port, a Small Computer System Interface (SCSI), an Internet SCSI (iSCSI), an Advanced Technology Attachment (ATA), a Serial ATA (SATA), a fiber channel, InfiniBand, a Peripheral Component Interconnect (PCI), a PCI eXtended interface (PCI-X), a PCI Express interface (PCIe), an InfraRed (IR) interface, a Radio Frequency (RF) interface, and a Universal Serial Bus (USB) interface.

The interface 138 may be used to enable the computing device 130 to communicate over a network, the Internet, a Wide Area Network (WAN), a Local Area Network (LAN), and the like. Alternatively, the interface 138 may enable communication directly with a Raman amplifier for adjusting the gain levels of its pumps. The interface 138 may include, for example, an Ethernet card or adapter (e.g., 10 BaseT, Fast Ethernet, Gigabit Ethernet, 10 GbE) or a Wireless LAN (WLAN) card or adapter (e.g., 802.11a/b/g/n/ac). The interface 138 may include address, control, and/or data connections to enable appropriate communications on the network.

In some embodiments, the computing device 130 may include an amplifier gain calibration program 144. The amplifier gain calibration program 144 may be implemented in any suitable combination of hardware, software, firmware, etc. When implemented in software or firmware, the amplifier gain calibration program 144 may be stored in a non-transitory computer-readable medium, such as the memory device 134, as shown in FIG. 7. When implemented in hardware, the amplifier gain calibration program 144 may be stored in the processing device 132. The amplifier gain calibration program 144 may include computer logic or instructions configured to enable the processing device 132 to perform certain functions, such as the two-step approach discussed in the present disclosure.

For example, in general, the amplifier gain calibration program 144 may include instructions which, when executed, enable the processing device 132 perform a two-step approach of setting the gain of a plurality of pump lasers of a Raman amplifier to a safe level. The pump lasers, for instance, are configured to operate at different wavelengths. The Raman amplifier is connected to a fiber span having a specific fiber-type. Also, this safe level is a level that keeps adverse intermodulation effects below a predetermined threshold regardless of the specific fiber-type. A second step enables the processing device 132 to increase the gain of the pump lasers without prior knowledge of the specific fiber-type of the fiber span while keeping the adverse intermodulation effects below the predetermined threshold.

Figure 8A:
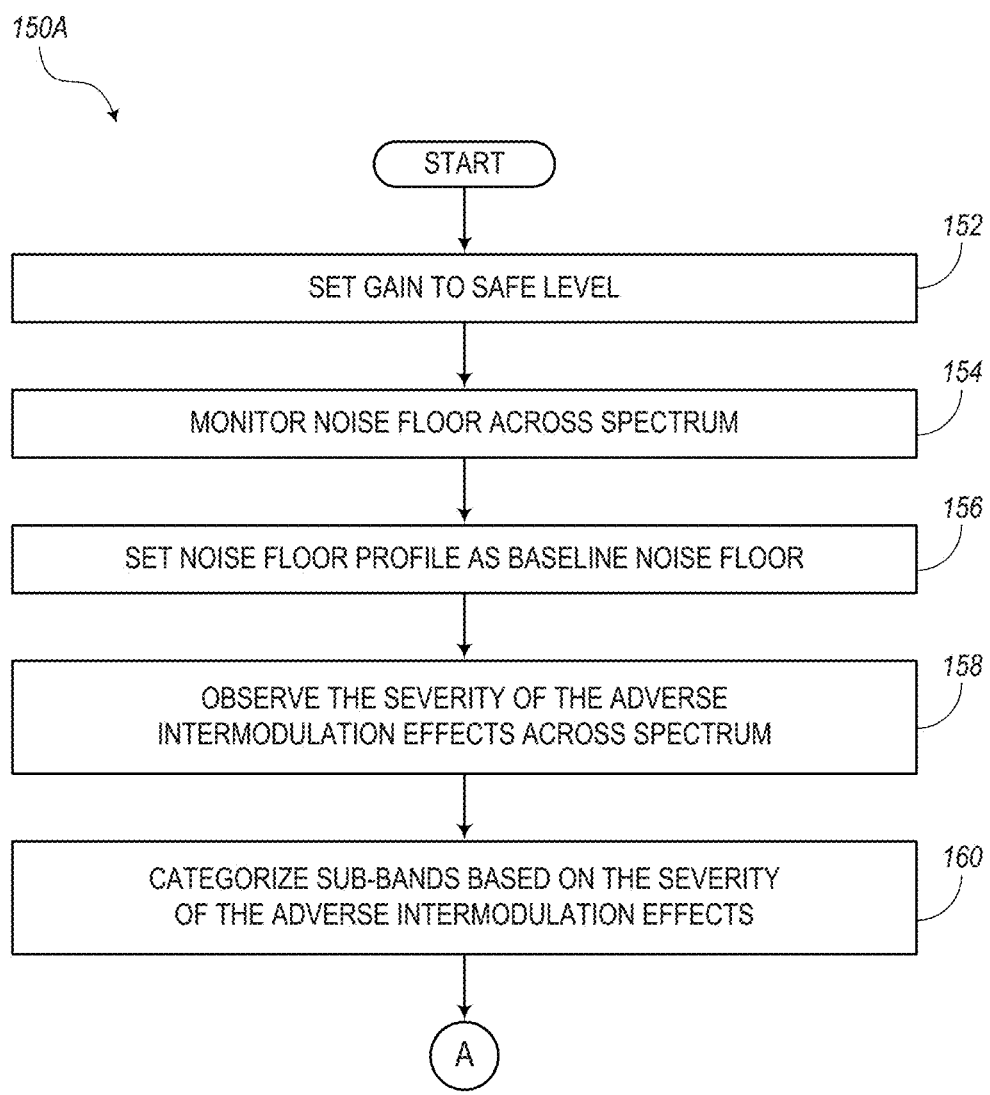
FIGS. 8A and 8B, in combination, are a flow diagram illustrating a first process for maximizing the gain of a Raman amplifier during calibration without prior knowledge of the fiber-type utilized in a portion of a network, according to various embodiments.
Figure 8B:
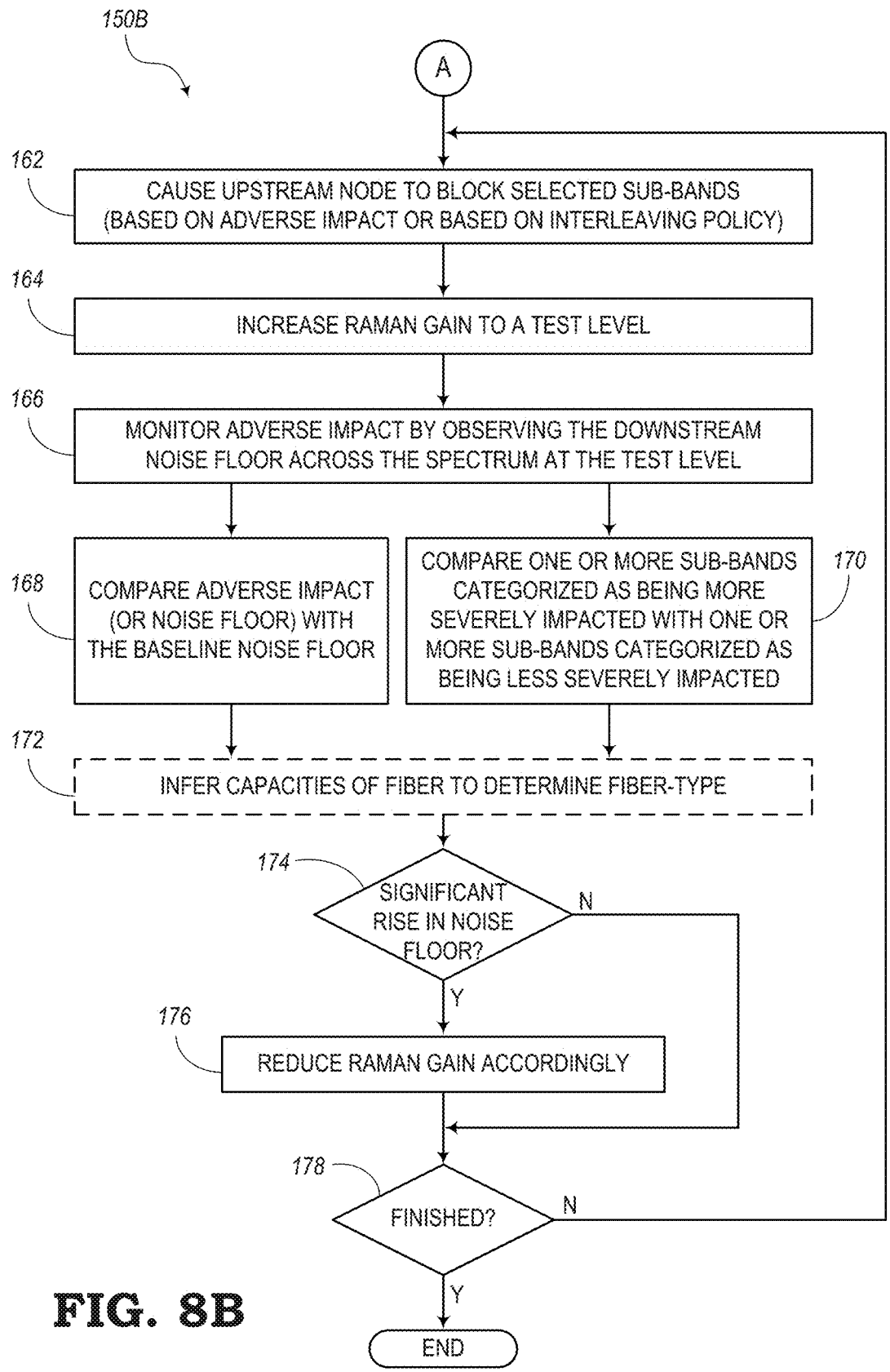

FIGS. 8A and 8B are parts of a flow diagram representing a first embodiment of a process 150 for maximizing the gain of an active Raman amplifier during calibration. For example, calibration may be performed without prior knowledge of the fiber-type utilized in a portion of a network relevant to the active Raman amplifier. FIG. 8A may represent the portion of the process 150 that may be interpreted as "step one" of the two-step approach and FIG. 8B may represent the portion of the process 150 that may be interpreted as "step two" of the two-step approach.

The process 150 includes a first step of setting the gain of the Raman amplifier to a safe level, as indicated in block 152. The process 150 also includes monitoring the noise floor across the spectrum of interest (e.g., C+L-band), as indicated in block 154. Next, the process 150 includes setting the monitored noise floor as a baseline noise floor, as indicated in block 156. The process 150 also includes observing the severity of the FWM impact (or other adverse intermodulation effects) across the spectrum, as indicated in block 158. Then, the process 150 is configured to categorize sub-bands (or specific frequencies or wavelengths) based on the severity of the adverse impact, as indicated in block 160.

In some implementations, the process 150 may also include determining the specific design of the pumps of the Raman amplifier, which may be based on how the sub-bands are affected and how they are categorized (block 160). The pump design may also be based on the observed severity of adverse effects (block 158). In this case, if the pump designed is determined, it may be possible to create a comparison of the different sub-bands at the safe level of gain.

As shown in FIG. 8B (e.g., step two), the process 150 includes causing an upstream node to block selected sub-bands, as indicated in block 162. The blocking may be based on the adverse impact as detected in block 158 or alternatively may be based on a pre-defined interleaving technique where pre-defined sub-bands may be separated and handled together. For example, the interleaving technique may include two sets of sub-bands (e.g., an even set and an odd set) or may include three or more sets of interleaved sub-bands. The establishment of interleaved sets may be used if the pump design is not known or known.

The process 150 further includes increasing the Raman gain to a test level, as indicated in block 164. Then, the process 150 includes monitoring the adverse impact by observing the downstream noise floor across the spectrum at the test level, as indicated in block 166. The process 150 may then proceed to either or both of blocks 168 and 170 for performing different steps. As indicated in block 168, the process 150 may include comparing the adverse impact (or the noise floor from block 166) of the spectrum at the test level with the baseline noise floor. As indicated in block 170, the process 150 may include comparing one or more sub-bands categorized as being more severely impacted (block 160) with one or more sub-bands categorized as being less severely impacted (block 160). After one or both of the steps of blocks 168 and 170, the process proceeds to block 172.

Block 172 includes the step of inferring the capacities of the fiber to determine the fiber-type, which may be an optional step in some implementations and could be omitted if it is determined that it does not necessarily contribute to the calibration of the Raman amplifier. The process 150 also includes the step of determining if there is a significant rise in the noise floor (e.g., above a certain threshold), as indicated in decision diamond 174. If there is a significant rise, then the process 150 proceeds to block 176 and includes reducing or adjusting the gain accordingly and proceeds to decision diamond 178. For example, reducing the gain may include setting the gain back to the original safe level (block 152). Otherwise, if no significant gain is detected in decision diamond 174, the process 150 skips block 176 and goes to decision diamond 178, which includes determining if the process is finished. For example, this determination may be based on whether or not the Raman amplifier has been optimized and thereby calibrated. In the example of processing interleaved sets of sub-bands, the determination may be based on whether or not there are additional sets to process. If it is determined that the process 150 is not done, the flow returns back to block 162 to block the next non-selected sub-bands. However, if it is determined that the process 150 is completed, the process 150 ends.

Therefore, the embodiments of the systems and methods of the present disclosure are configured to calibrate a Raman amplifier even without knowledge of the fiber-types. Although the fiber-types may be determined from the present processes, it is not necessarily needed for calibration purposes.

Again, the two-step approach may include 1) setting the Raman gain to a safe level and checking the noise floor at this safe level and 2) raising the Raman gain and checking if the noise floor increases significantly. If there is a significant increase, the gain can be reduced back down to the original safe level. If there is not a significant increase, the gain can remain at the elevated level. In this way, the gain of the Raman amplifier can be optimized while avoiding levels that would generate adverse intermodulation effects (e.g., FWM) in the spectrum.

Knowing that the effect of FWM appears only at certain spectrum locations for a given Raman pump design, the systems and methods of the present disclosure may be configured to break down the Raman gain calibration process into the two-step approach in order to maximize the Raman gain for a given fiber span. In the first step, the Raman gain is set to a level that is "safe" to avoid FWM for any fiber-types, while in the second step, selective spectrum locations are blocked in the upstream node (e.g., Node A) and then Raman gains are increased and the intermodulation effects (if present) are monitored. The method eliminates the need for any user-provisioned fiber-types at the remote end (e.g., Node B) where the counter-propagating Raman amplifier is operating to eliminate or reduce the chance for user errors and costly system turn-up delays.

In C+L-band systems, FWM impacts in-band OSNR for the channels of the C-band and the L-band. The proposed method explicitly focuses on maximizing Raman gain in C+L-band systems by detecting in-band FWM impacts.

Based on the observation that intermodulation effects (e.g., FWM effects) will have an impact only at specific spectrum locations (e.g., sub-bands) for a given Raman pump design, the present embodiments utilize this observation and are configured to break down Raman gain calibration into the two-step approach. At the first step, the process includes auto-calibrating the Raman amplifier to a safe target gain level in all spans across the Optical Multiplex Section (OMS) while considering the fact that the associated fiber in each span could be an NZDSF type. Hence, the process can avoid generating high gain as it may cause FWM.

At the second step, the process includes selecting "spectrum locations" (e.g., specific frequencies, specific frequency ranges, specific wavelengths, specific wavelength ranges, sub-bands, etc.) at a node that is upstream of the Raman amplifier of interest. For example, the spectrum locations may be based on whether or not the FWM (or other intermodulation effects) has an impact on the spectrum locations and/or is expected to have an impact on the spectrum locations. The spectrum location may be selected or blocked based on which noise floor is to be monitored at each stage of the process.

The gain for a given Raman amplifier is increased in the second step (e.g., using pump overlaps and Pulse Width Modulation (PWM) techniques considering a potential NDSF fiber-type) up to a maximum level, such as a level at which double Rayleigh scattering can still be avoided for a given fiber span, which can be about 6 dB to 8 dB lower than the measured fiber loss. The noise floors at the selectively blocked spectrum locations are relatively compared if certain locations with expected FWM show a significant rise in the noise floor compared to non-expected locations. If there is a significant rise, the Raman gain is reduced back to first step safe level. If there is not a significant rise, the Raman gain is left at the maximized level for the given fiber span. The step of increasing Raman gain is then repeated for downstream spans sequentially one at a time.

In some embodiments, if a Raman pump design is unknown and the potential spectrum locations of the FWM peaks would also thereby be unknown, a generic interleaving bundling rule can be applied to monitor the spectrum locations. The available traffic spectrum (e.g., in the C+L-band) is divided into logical spectrum slots (e.g., frequency ranges, wavelength ranges, sub-bands, etc.), where each spectrum slot may be about 100 GHz wide. In one action with two sets of spectrum slots, all even-numbered slots are blocked, while the odd-numbered slots remain open, and the full spectrum is monitored (e.g., at the telemetry elements 30, 32) at the first spectrum monitoring location. Then, in the next action, all odd-numbered slots are blocked while keeping the even-numbered slots open. A combination of both actions gives a full noise floor view for a given Raman target-gain. Once the Raman gain is increased to max, the process is repeated that also reveals the FWM peaks, if any. For processes where the spectrum is divided into more than two (even and odd) slots, a similar procedure can be followed where a first set remains open while the other sets are blocked and the spectrum is monitored. These method allow a check of in-band noise floor profiles without changing more than 50% of the spectrum-loading from the photonic line system.

Figure 9:
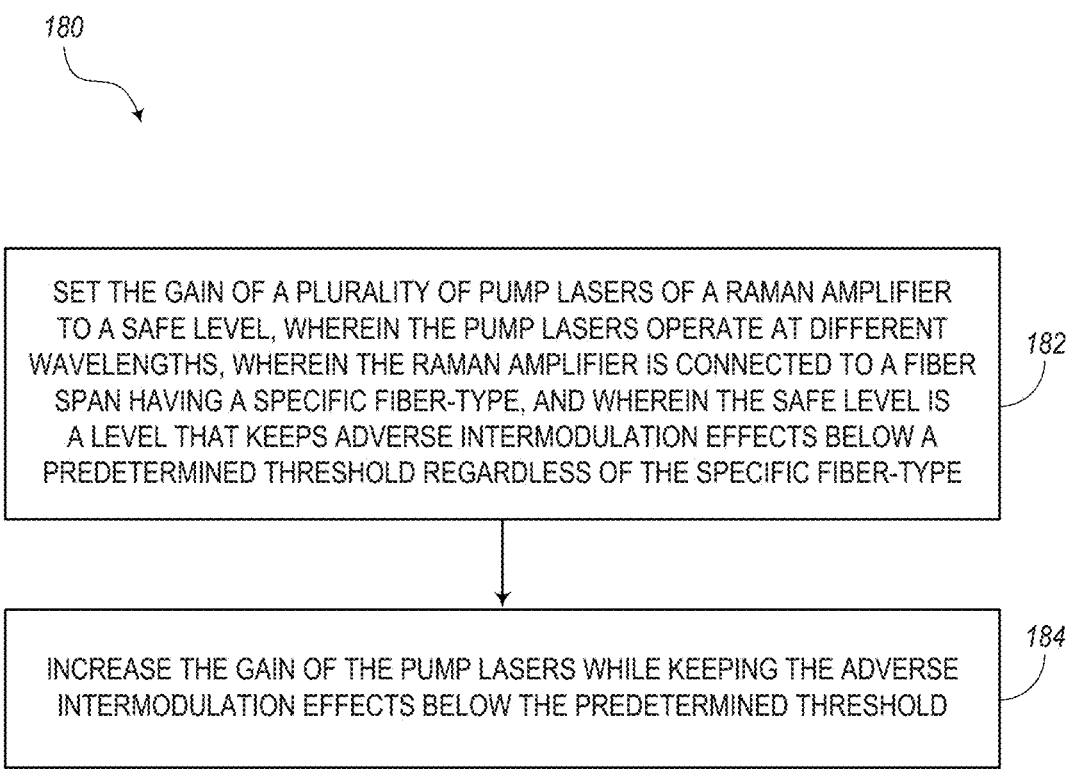
FIG. 9 is a flow diagram illustrating a second process for maximizing the gain of a Raman amplifier during calibration without prior knowledge of the fiber-type utilized in a portion of a network, according to various embodiments.

FIG. 9 is a flow diagram illustrating another embodiment of a process 180 for maximizing the gain of a Raman amplifier during calibration without prior knowledge of the relevant fiber-type. As illustrated, the process 180 includes setting the gain of a plurality of pump lasers of a Raman amplifier to a safe level, as indicated in block 182, where the pump lasers operate at different wavelengths. The Raman amplifier is connected to a fiber span having a specific fiber-type. Also, the "safe" level is a level that keeps adverse intermodulation effects below a predetermined threshold regardless of the specific fiber-type. The process 180 further includes the step of increasing the gain of the pump lasers without prior knowledge of the specific fiber-type of the fiber span while keeping the adverse intermodulation effects below the predetermined threshold, as indicated in block 184.

In some embodiments, the process 180 may further be configured in a calibration methodology, whereby the adverse intermodulation effects may be caused by the different wavelengths of the pump lasers. The adverse intermodulation effects, for example, may be caused by a Four Wave Mixing (FWM) phenomenon. The severity of the adverse intermodulation effects, for example, may be related to the specific fiber-type of the fiber span.

According to some implementations, the process 180 may include the step of obtaining a first measurement of a noise floor of a spectrum associated with operation of an Optical Multiplex Section (OMS) that includes at least the Raman amplifier and the fiber span when the gain is set to the safe level. Then, a step of setting the first measurement as a baseline noise profile may be performed. Then, the process 180 may include the steps of obtaining a second measurement of the noise floor of the spectrum after the gain is increased and then comparing the second measurement with the baseline noise profile. In response to determining a significant rise in the second measurement with respect to the baseline noise profile, the process 180 may also include the step of reducing the gain back to the safe level. The process 180 may also include a) observing the severity of the adverse intermodulation effects on the spectrum, b) categorizing a plurality of sub-bands in the spectrum based on the severity of adverse intermodulation effects, and c) blocking one or more sub-bands based on the categorizing of the sub-bands before obtaining the second measurement. The process 180 may also include the step of inferring the fiber-type based on the sub-bands that are more severely impacted by the adverse intermodulation effects. Also, the process 180 may include the steps of a) creating two or more sets of interleaved sub-bands in the spectrum, and b) obtaining the second measurement for one set of interleaved sub-bands at a time while blocking the other set or sets of interleaved sub-bands.

In accordance with still additional embodiments, the process 180 may further include the step of maintaining the power of a spectrum within a predetermined variability range, where the spectrum associated with operation of an Optical Multiplex Section (OMS) may include at least the Raman amplifier and the fiber span. The process 180 may also maintain an Optical Signal-to-Noise Ratio (OSNR) of a spectrum above a predetermined threshold. The spectrum, for example, may include C-band wavelengths and L-band wavelengths. The Raman amplifier, for example, may be a counter-propagating amplifier whereby the fiber span of interest includes at least an adjacent portion that provides ingress traffic to the Raman amplifier. The fiber-type, for example, may be a Non-Dispersion Shifted Fiber (NDSF), a Non-Zero Dispersion Shifted Fiber (NZDSF), or other suitable types.

Figure 10A:
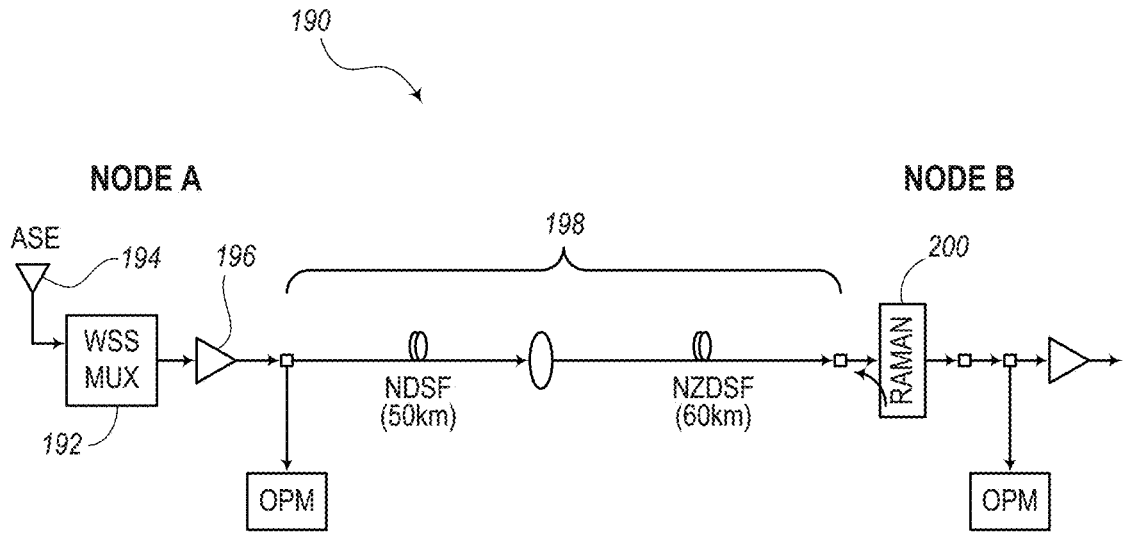
FIGS. 10A and 10B are schematic diagrams illustrating portions of a network in which windows of an optical spectrum are blocked at the source, according to various embodiments.
Figure 10B:
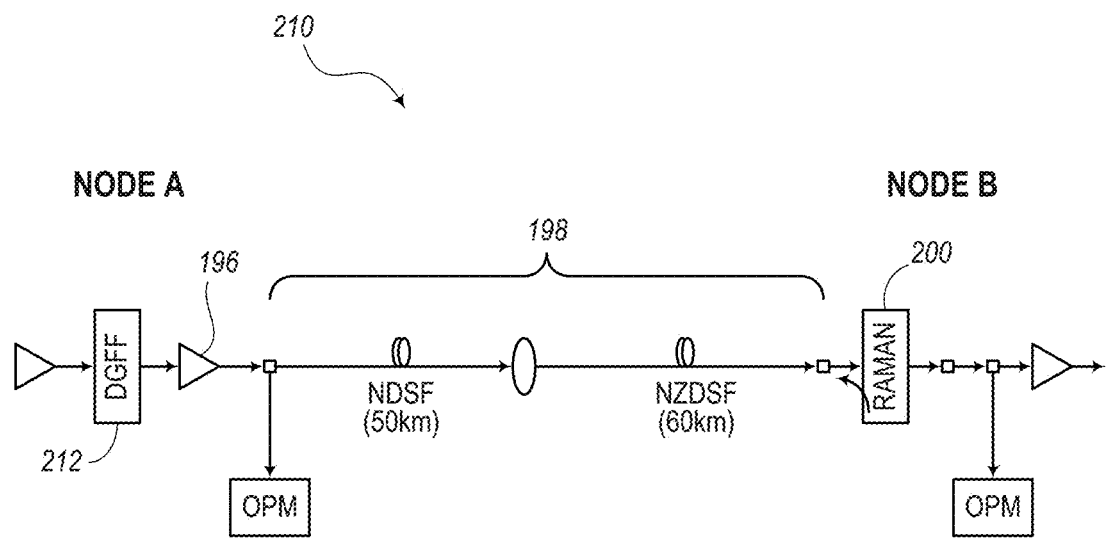

FIGS. 10A and 10B are schematic diagrams illustrating examples of elements used for blocking spectrum locations as defined in the present disclosure. The elements may be parts of the photonic line systems 10, 80, 100, or other systems in which windows (e.g., sub-bands, spectrum slots, etc.) of an optical spectrum can be blocked at the source.

For example, FIG. 10A shows a system 190 in which a Wavelength Selective Switching (WSS) multiplexer 192 at Node A is configured to receive ASE channel signals from an ASE source 194. The WSS multiplexer 192 is configured to provide the selected signals to the amplifier 196 for transport along the fiber span 198 to Node B, where a counter-propagating Raman amplifier 200 is arranged.

Upstream of the Raman amplifier 200, if the fiber span 198 contains a section mux with spectrum-selective switching capabilities (e.g., such as the WSS multiplexer 192), then the WSS multiplexer 192 may be configured to block the selective spectrum during the blocking stage of step two of the two-step calibration approach. Thereafter, a sequential calibration procedure can be used to maximize the Raman gain, which allows the WSS multiplexer 192 to block the selective spectrum only at the section-head (Node A) and then continue maximizing the gain span by span.

In FIG. 10B, a system 210, which may be similar to system 190 of FIG. 10A, includes a Dynamic Gain Flattening Filter (DGFF) 212 arranged before the amplifier 196. If upstream of the Raman amplifier 200, the fiber span 198 receives signals from Node A that includes the DGFF 212 or another suitable wavelength blocker module, the DGFF 212 can thereby be used to block selective spectrum during step two of the two-step approach. Having the DGFF 212 (or WB) in any span allows the system to run the second step for the downstream Raman amplifier 200 without sequencing actions with upstream spans or section-head.

Figure 11A:
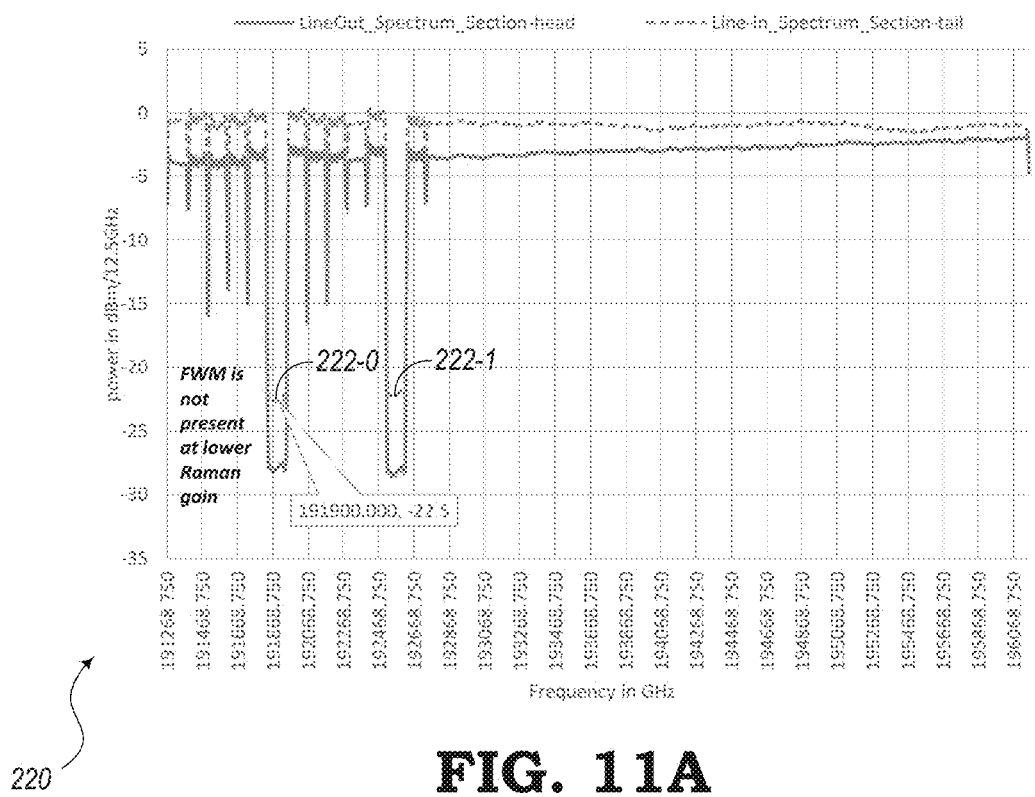
FIGS. 11A and 11B are graphs showing an example of the effects of FWM when the gain of a Raman amplifier is increased to a maximum level.
Figure 11B:
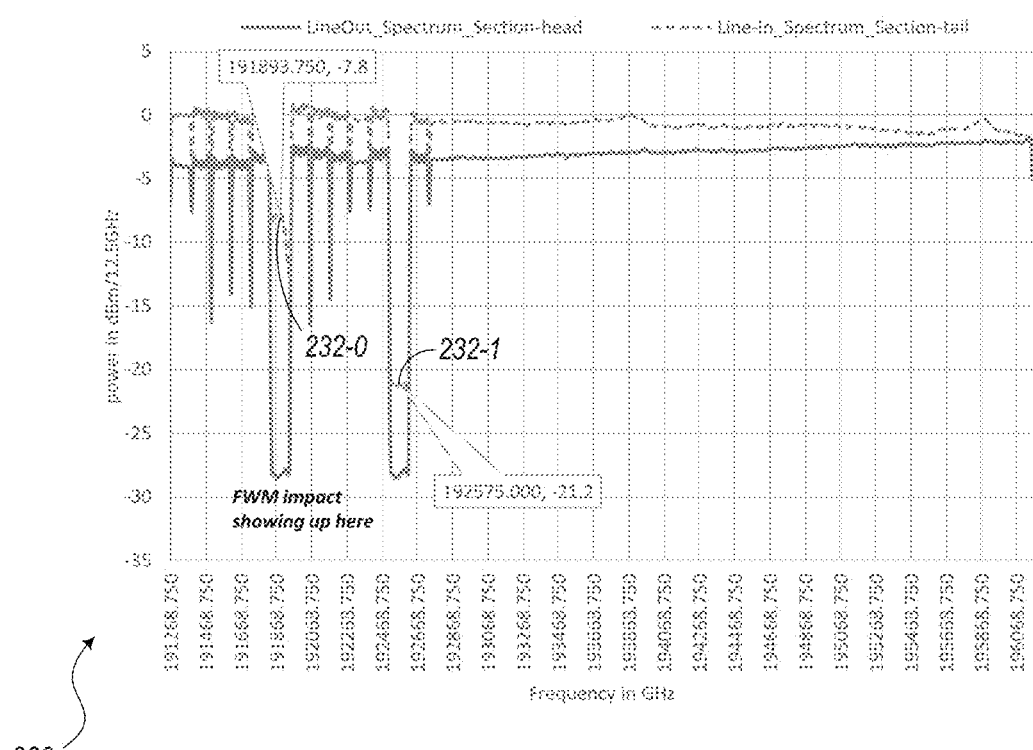

FIGS. 11A and 11B are graphs 220, 230, respectively, showing examples of the effects of FWM when the gain of a Raman amplifier is increased to a maximum level. These example show the impact of FWM, which may be evident up to certain spectrum locations when the Raman gain is increased to a maximum level on an NZDSF fiber-type that directly impacts the OSNR and impacts data traffic. It may be noted that an NDSF fiber may be able to adequately tolerate this higher Raman gain with no FWM impact.

In FIG. 11A, the graph 220 shows a test based on the use of a single fiber span having a 2 km NDSF plus a 116 km NZDSF (e.g., ELEAF). The Raman amplifier is set at a gain of 16.7 dB. The spectrum is blocked at selective locations (e.g., sub-bands) at the transmit end (e.g., Node A acting as the section-head). In this example, a modem is configured to operate at 95 GBaud and was able to carry traffic over the span at 400 Gbps with 12.46 dB Effective Signal-to-Noise Ratio (ESNR), which considers both linear and non-linear penalties. It may be noted in the graph 220 that noise floors 222-0 and 222-1 can be observed at the two specific sub-bands.

In FIG. 11 B, the graph 230 shows a test based on a single fiber span having a 2 km NDSF plus a 116 km NZDSF. The Raman amplifier is set at a gain 19.2d B. The spectrum blocked at selective locations (e.g., sub-bands) at the transmit end (e.g., Node A acting as the section-head). The same modem operating at 95 GBaud was used, but it failed to carry traffic over that span at 400 Gbps in this test. However, after downgrading to 300 Gbps, the modem was able to carry traffic with 6.72 dB ESNR. It may also be noted in the graph 230 that noise floors 232-0 and 232-1 can be observed at the two specific sub-bands.

Referring again to FIG. 4, for example, it may be noted that the ESNR for a specific channel in question does not carry data at 400 Gbps. However, the reverse direction with the NDSF nearest to Node A, data traffic can be sufficiently carried. Also, the modem may be configured carry data at 300 Gbps. The Raman gain at 19.2 dB is considered to be a high level gain with pump overlaps, which are able to take advantage of the NDSF fiber-type.

FIGS. 12A and 12B are tables 240, 250, respectively, showing examples of ESNR and the received optical channel power values obtained at different frequencies (in THz) with respect to the network 80 of FIG. 4.

The systems and methods of the present disclosure are configured to consider the fact that the effects of FWM normally only impact certain spectrum locations for a given Raman pump design. By monitoring in-band noise power at these spectrum locations, the Raman gain can be maximized per span without relying on an assumed fiber-type, since the intended provisioning does not always match the actual provisioning.

One novel of the present disclosure is the two-step calibration approach, whereby, following the first step, a baseline snapshot of underlying noise floors (e.g., level 222-0, 222-1) can be observed and these can be compared among different spectrum locations at typical Raman gain levels. In the second step, with increased Raman gain, the new noise floors (e.g., levels 232-0, 232-1) can be observed and compared with the first step level and with different spectrum locations along the spectrum to realize the impact that FWM has on different spectrum locations. It can also be determined if the FWM impact is visible after the second step.

Another novel aspect of the present disclosure with respect to conventional systems is that the present embodiments are configured to perform a step of selecting potential spectrum locations, where FWM impact or other adverse intermodulation effects can occur within the C+L-band spectrum. Also, there is novelty in selecting locations where FWM is not expected, which may be based on a specific Raman pump design. The systems and methods also allow searching for FWM impact across the spectrum, even if potential FWM spectrum locations are not known. Also, another point of novelty is the step of blocking some selective spectrum locations from upstream or using an interleaving blocking method to check for the downstream noise-floor and determining whether or not there is a change in the overall spectrum loading for the line system. Hence, the actual Raman gain calibration process for maintaining flat Raman gain can remain uninterrupted.

The present disclosure is configured to provide certain benefits with respect to conventional systems. For example, conventional deployment rules usually rely heavily on correctly identifying the fiber-type provisioning during a deployment stage and during a modelling stage during network planning. Mixed fiber-types usually bring a big challenge in the design and confusion over how the fiber-types can be modelled or provisioned in the field can also be a challenge. However, the present disclosure is configured to overcome these worries and can simplify the planning and provisioning stages and ensure that a Raman amplifier can be calibrated to optimal levels to provide high gain while also avoiding adverse intermodulation effects.

Another benefit of the present disclosure is that deployment and operation can save money for the installer and the service provider by minimizing errors, such as costly provisioning errors. The present disclosure also allows deployment solutions that are agnostic to provisioning errors and can ease deployment rules as well.

Although the present disclosure has been illustrated and described herein with reference to various embodiments and examples, it will be readily apparent to those of ordinary skill in the art that other embodiments and examples may perform similar functions, achieve like results, and/or provide other advantages. Modifications, additions, or omissions may be made to the systems, apparatuses, and methods described herein without departing from the spirit and scope of the present disclosure. All equivalent or alternative embodiments that fall within the spirit and scope of the present disclosure are contemplated thereby and are intended to be covered by the following claims.

What is claimed is:

1. A calibration system comprising:
a processing device, and
a memory device configured to store a computer program having instructions that, when executed, enable the processing device to
set gain of a plurality of pump lasers of a Raman amplifier to a safe level, wherein the pump lasers operate at different wavelengths, wherein the Raman amplifier is connected to a fiber span having a specific fiber-type, and wherein the safe level is a level that keeps adverse intermodulation effects below a predetermined threshold regardless of the specific fiber-type,
increase the gain of the pump lasers while keeping the adverse intermodulation effects below the predetermined threshold,
obtain a first measurement of a noise floor of a spectrum associated with operation of an Optical Multiplex Section (OMS) that includes at least the Raman amplifier and the fiver span when the gain is set to the safe level,
set the first measurement as a baseline noise profile,
obtain a second measurement of the noise floor of the spectrum after the gain is increased, and
compare the second measurement with the baseline noise profile.

2. The calibration system of claim 1, wherein the adverse intermodulation effects are caused by the different wavelengths of the pump lasers.

3. The calibration system of claim 2, wherein the adverse intermodulation effects are caused by a Four Wave Mixing (FWM) phenomenon.

4. The calibration system of claim 1, wherein the severity of the adverse intermodulation effects is related to the specific fiber-type of the fiber span.

5. The calibration system of claim 1, wherein, in response to determining a significant rise in the second measurement at least in one or more spectrum locations or sub-bands with respect to the baseline noise profile, the instructions further enable the processing device to reduce the gain back to the safe level.

6. The calibration system of claim 1, wherein the instructions further enable the processing device to
observe the severity of the adverse intermodulation effects on the spectrum,
categorize a plurality of sub-bands in the spectrum based on the severity of adverse intermodulation effects, and
block one or more sub-bands based on the categorizing of the sub-bands before obtaining the second measurement.

7. The calibration system of claim 6, wherein the instructions further enable the processing device to infer the fiber-type based on the sub-bands more severely impacted by the adverse intermodulation effects.

8. The calibration system of claim 1, wherein the instructions further enable the processing device to
create two or more sets of interleaved sub-bands in the spectrum, and
obtain the second measurement for one set of interleaved sub-bands at a time while blocking the other set or sets of interleaved sub-bands.

9. The calibration system of claim 1, wherein the fiber-type is one of at least a Non-Dispersion Shifted Fiber (NDSF) and a Non-Zero Dispersion Shifted Fiber (NZDSF).

10. A calibration system comprising:
a processing device, and
a memory device configured to store a computer program having instructions that, when executed, enable the processing device to
set gain of a plurality of pump lasers of a Raman amplifier to a safe level, wherein the pump lasers operate at different wavelengths, wherein the Raman amplifier is connected to a fiber span having a specific fiber-type, and wherein the safe level is a level that keeps adverse intermodulation effects below a predetermined threshold regardless of the specific fiber-type,
increase the gain of the pump lasers while keeping the adverse intermodulation effects below the predetermined threshold, and
one of (1) maintain the power of a spectrum within a predetermined variability range, the spectrum associated with operation of an Optical Multiplex Section (OMS) that includes at least the Raman amplifier and the fiber span, and (2) maintain an Optical Signal-to-Noise Ratio (OSNR) of a spectrum above a predetermined threshold, the spectrum associated with operation of the OMS that includes at least the Raman amplifier and the fiber span.

11. The calibration system of claim 10, wherein the adverse intermodulation effects are caused by the different wavelengths of the pump lasers.

12. The calibration system of claim 11, wherein the adverse intermodulation effects are caused by a Four Wave Mixing (FWM) phenomenon.

13. The calibration system of claim 10, wherein the severity of the adverse intermodulation effects is related to the specific fiber-type of the fiber span.

14. The calibration system of claim 10, wherein the spectrum includes C-band wavelengths and L-band wavelengths.

15. The calibration system of claim 10, wherein the fiber-type is one of at least a Non-Dispersion Shifted Fiber (NDSF) and a Non-Zero Dispersion Shifted Fiber (NZDSF).

16. A calibration system comprising:
a processing device, and
a memory device configured to store a computer program having instructions that, when executed, enable the processing device to
set gain of a plurality of pump lasers of a Raman amplifier to a safe level, wherein the pump lasers operate at different wavelengths, wherein the Raman amplifier is connected to a fiber span having a specific fiber-type, and wherein the safe level is a level that keeps adverse intermodulation effects below a predetermined threshold regardless of the specific fiber-type, increase the gain of the pump lasers while keeping the adverse intermodulation effects below the predetermined threshold, wherein the Raman amplifier is a counter-propagating amplifier whereby the fiber span of interest includes at least an adjacent portion that provides ingress traffic to the Raman amplifier.

17. The calibration system of claim 16, wherein the adverse intermodulation effects are caused by the different wavelengths of the pump lasers.

18. The calibration system of claim 16, wherein the severity of the adverse intermodulation effects is related to the specific fiber-type of the fiber span.

19. The calibration system of claim 16, wherein the spectrum includes C-band wavelengths and L-band wavelengths.

20. The calibration system of claim 16, wherein the fiber-type is one of at least a Non-Dispersion Shifted Fiber (NDSF) and a Non-Zero Dispersion Shifted Fiber (NZDSF).

* * * * *